US008356696B1

(12) United States Patent
Carroll et al.

(10) Patent No.: US 8,356,696 B1
(45) Date of Patent: Jan. 22, 2013

(54) AIR-OPERATED DEVICE AND METHOD FOR LUBRICATING COMPONENTS WITH ELIMINATION OF LUBRICANT WASTE

(75) Inventors: Brian Carroll, Leeds, AL (US); Michael Neu, Oxford, AL (US); Chris Petty, Anniston, AL (US); Dudley Headley, Cropwell, AL (US); David McCoy, Leeds, AL (US); Stephen Smith, Munford, AL (US)

(73) Assignee: Honda Motor Co., Ltd., Tokyo (JP)

( * ) Notice: Subject to any disclaimer, the term of this patent is extended or adjusted under 35 U.S.C. 154(b) by 380 days.

(21) Appl. No.: 12/483,931

(22) Filed: Jun. 12, 2009

(51) Int. Cl.
  *F01M 1/00* (2006.01)
  *F01M 11/00* (2006.01)
  *F16N 7/34* (2006.01)
  *B05B 5/025* (2006.01)
  *B05B 7/00* (2006.01)
  *A61M 11/06* (2006.01)

(52) U.S. Cl. ............ 184/6.26; 184/6.28; 184/55.1; 118/634; 118/300; 118/50; 118/629; 118/64; 239/338

(58) Field of Classification Search .......... 184/6.26, 184/6.21, 6.23, 6.28, 7.4, 55.1, 55.2, 26, 184/40, 50.2; 118/326, 309, 634, 50, 300, 118/313, 314, 315, 316, 239, 629, 64; 73/10; 34/585; 239/338
See application file for complete search history.

(56) References Cited

U.S. PATENT DOCUMENTS

| | | | | |
|---|---|---|---|---|
| 3,131,869 A | | 5/1964 | Vega et al. | |
| 3,421,702 A | * | 1/1969 | O'Brien | 239/418 |
| 3,491,855 A | * | 1/1970 | Obergefell et al. | 184/55.1 |
| 3,618,709 A | * | 11/1971 | Boelkins | 184/6.4 |
| 3,731,393 A | * | 5/1973 | Okada et al. | 34/369 |
| 4,284,174 A | | 8/1981 | Salvana et al. | |
| 4,338,958 A | * | 7/1982 | Fujita | 134/104.2 |
| 4,353,435 A | * | 10/1982 | Abrams et al. | 184/6.26 |
| 4,421,798 A | * | 12/1983 | Lin | 427/209 |
| 5,067,591 A | | 11/1991 | Fehlig | |
| 5,449,051 A | | 9/1995 | Liao | |
| 5,690,995 A | * | 11/1997 | Fischli et al. | 427/180 |
| 5,806,630 A | * | 9/1998 | Bernal | 184/6.26 |
| 6,199,663 B1 | * | 3/2001 | Roy et al. | 184/55.1 |
| 6,264,745 B1 | * | 7/2001 | Diaz | 118/326 |
| 6,390,241 B1 | | 5/2002 | Nemie, Jr. | |
| 6,405,944 B1 | * | 6/2002 | Benalikhoudja | 239/338 |
| 6,474,445 B2 | | 11/2002 | Nemie, Jr. | |
| 6,659,370 B1 | * | 12/2003 | Inoue | 239/423 |
| 6,679,484 B2 | * | 1/2004 | Hattori | 261/64.1 |
| 6,896,103 B2 | | 5/2005 | Naumann et al. | |
| 6,898,959 B2 | | 5/2005 | Sekine et al. | |
| 7,014,670 B2 | * | 3/2006 | Shutic et al. | 55/315 |
| 7,407,118 B2 | * | 8/2008 | Sevy | 239/347 |
| 2005/0056490 A1 | * | 3/2005 | Maret et al. | 184/6.2 |
| 2006/0070421 A1 | * | 4/2006 | Landvatter et al. | 72/342.3 |
| 2008/0083676 A1 | * | 4/2008 | DePaul | 210/774 |

* cited by examiner

*Primary Examiner* — Michael Mansen
*Assistant Examiner* — Minh Truong
(74) *Attorney, Agent, or Firm* — Standley Law Group LLP

(57) ABSTRACT

A system and method for lubricating components where the lubricant is applied in mist form within a substantially enclosed cavity. The cavity contains a draining aperture which collects excess lubricant for subsequent re-use by the system. The cavity is defined by a spray head that includes a base having attached thereto a cover plate with an opening adapted to receive therethrough a component to be lubricated. The cavity and lubrication chamber prevents the escape of excess lubricant. The collection and reuse of excess lubricant provides a closed loop system that reduces lubricant waste.

19 Claims, 4 Drawing Sheets

US 8,356,696 B1

AIR-OPERATED DEVICE AND METHOD FOR LUBRICATING COMPONENTS WITH ELIMINATION OF LUBRICANT WASTE

BACKGROUND OF THE INVENTIVE FIELD

The present invention is directed generally to a system and method for lubricating components while preventing contamination of the surrounding area and re-capturing unused portions of lubricant for subsequent re-use.

At points during the assembly of various devices, it may be desirable or necessary to lubricate one or more individual components thereof. Lubrication may be necessary to proper subsequent operation of a device. Lubrication may also facilitate assembly by reducing installation force, which may result in reduced assembly cycle times and, thus, manufacturing costs.

It has been found that applying lubricants in the form of a fine mist or pressurized spray is one of the most effective ways to lubricate components, as a mist provides a more uniform distribution of lubricant. However, it has been found that the application of lubricants in the form of a fine mist can be difficult to control. When a mist is used within an open environment there may be overspray and subsequent contamination of other components (e.g., other device components that do not require lubrication). This results in a waste of lubricant, and may be detrimental to the inadvertently lubricated component(s). In addition, once the lubricant mist becomes airborne it may settle on the clothing or skin of an operator or other nearby personnel. Further, overspray may fall upon work surfaces, including platforms, flooring, or other work surfaces that may result in slippery conditions.

SUMMARY OF THE GENERAL INVENTIVE CONCEPT

The present invention is directed to systems, devices and methods that eliminate or minimize the aforementioned problems with applying a lubricant mist. Exemplary embodiments of the present invention permit the application of a pressurized spray or fine mist of lubricant to components of interest. A component(s) requiring lubrication is placed in an enclosed lubrication chamber that includes a spray head. Lubricant is drawn into the spray head from a lubricant reservoir. The spray head injects a fine mist of lubricant onto the component of interest, which mist is substantially contained within the lubrication chamber. Excess lubricant drains through a provided orifice in the lubrication chamber and returns to the reservoir via a drain line for subsequent re-use. Thus, the lubrication process can be more accurately controlled and overspray is significantly reduced. Further, the ability to recapture unused lubricant significantly reduces waste and may provide a substantial cost savings.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein.

DETAILED DESCRIPTION OF EXEMPLARY EMBODIMENT(S)

Figure 1:
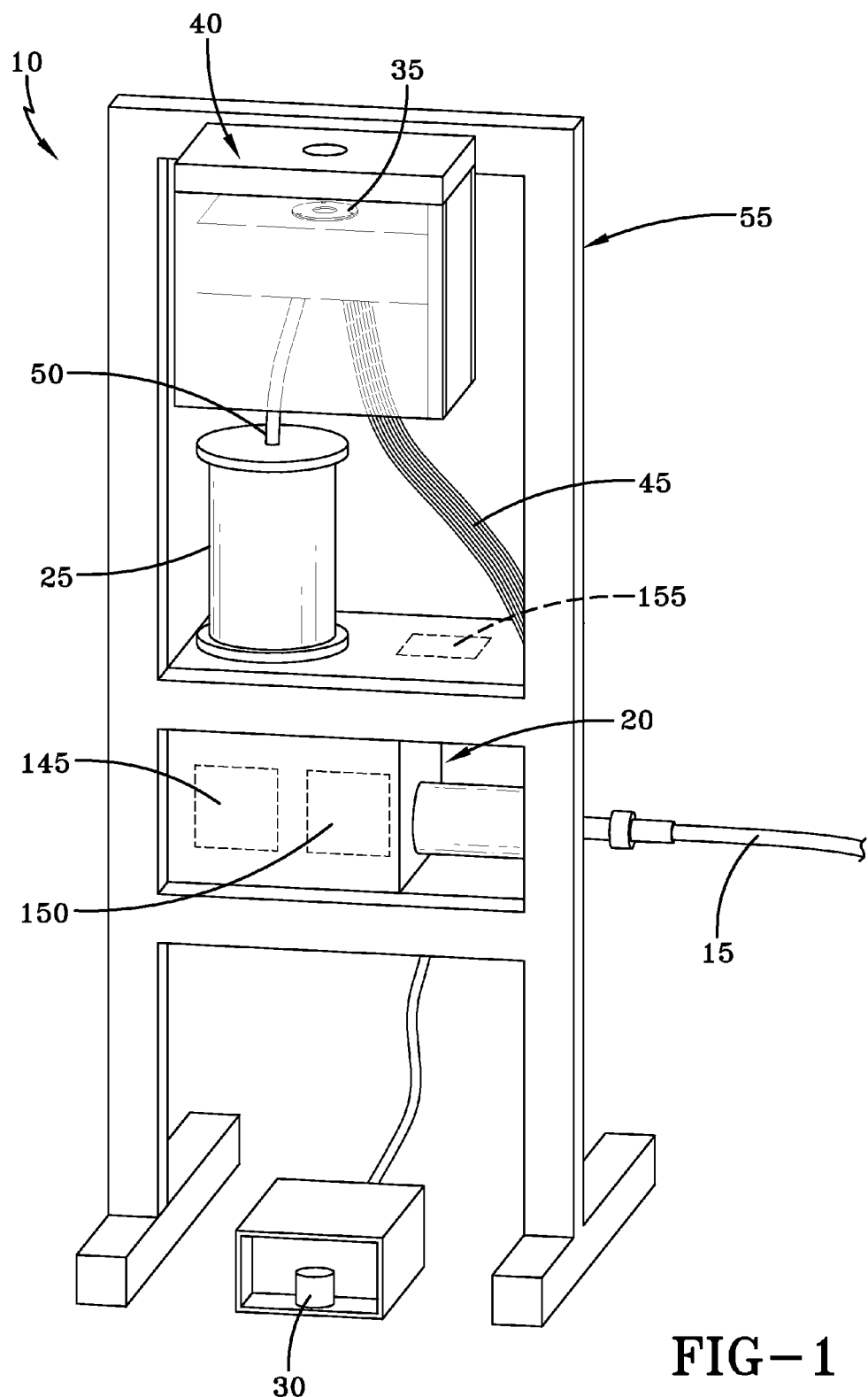
FIG. 1 is a front perspective view of an exemplary lubrication system of the present invention.

FIGS. 1-4 illustrate one exemplary embodiment of a lubricant application system 10 of the present invention. The system 10 includes a pneumatic source line 15 in communication with a pneumatic pump 20, which includes both a lubricant pump 145 and an air pump 150 portion. The pneumatic pump 20 is also in communication with a lubricant reservoir 25 that holds a supply of lubricant. An actuator 30 (in this particular case, a foot switch) is provided to activate the pneumatic pump 20, thereby causing lubricant and pressurized air to be transferred from the lubricant reservoir 25 to a spray head 35 located within an enclosed lubrication chamber 40. A bundle of separate lubricant and air supply lines 45 extend from the pump 20 to transfer the lubricant and air to corresponding lubricant orifices and air nozzles within the spray head 35. Other embodiments may employ a lesser or greater number of lubricant and air supply lines depending on the number of lubricant orifices and air nozzles present in the spray head. The various components of the system 10 may be mounted to a frame 55 as shown, or to another structure that allows their retention in a desired arrangement. Such a frame 55 may be provided with wheels or may otherwise made mobile so as to permit easy relocation thereof.

Figure 3:
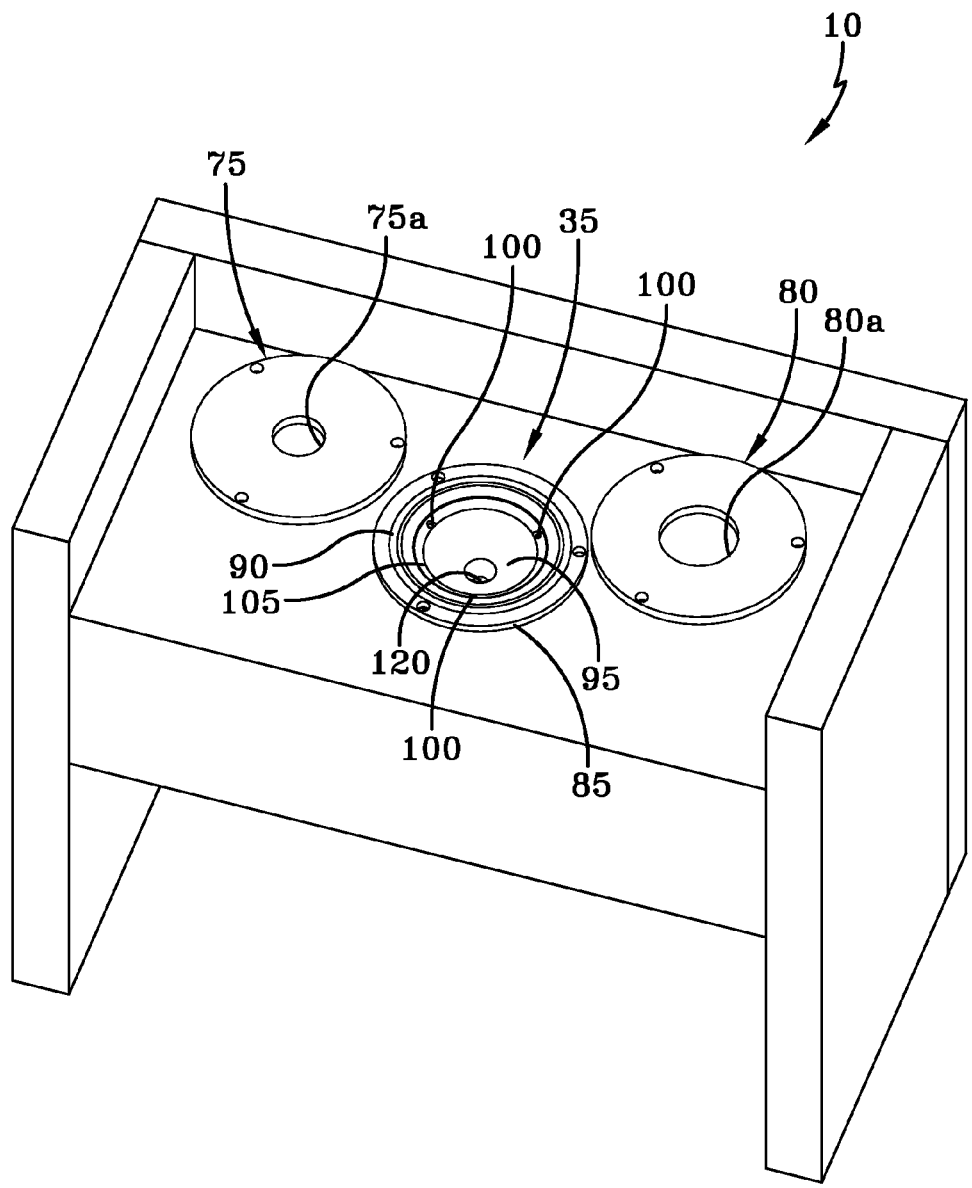
FIG. 3 is a top perspective view of a spray head with the top cover removed to better show the features of a base portion thereof.
Figure 4:
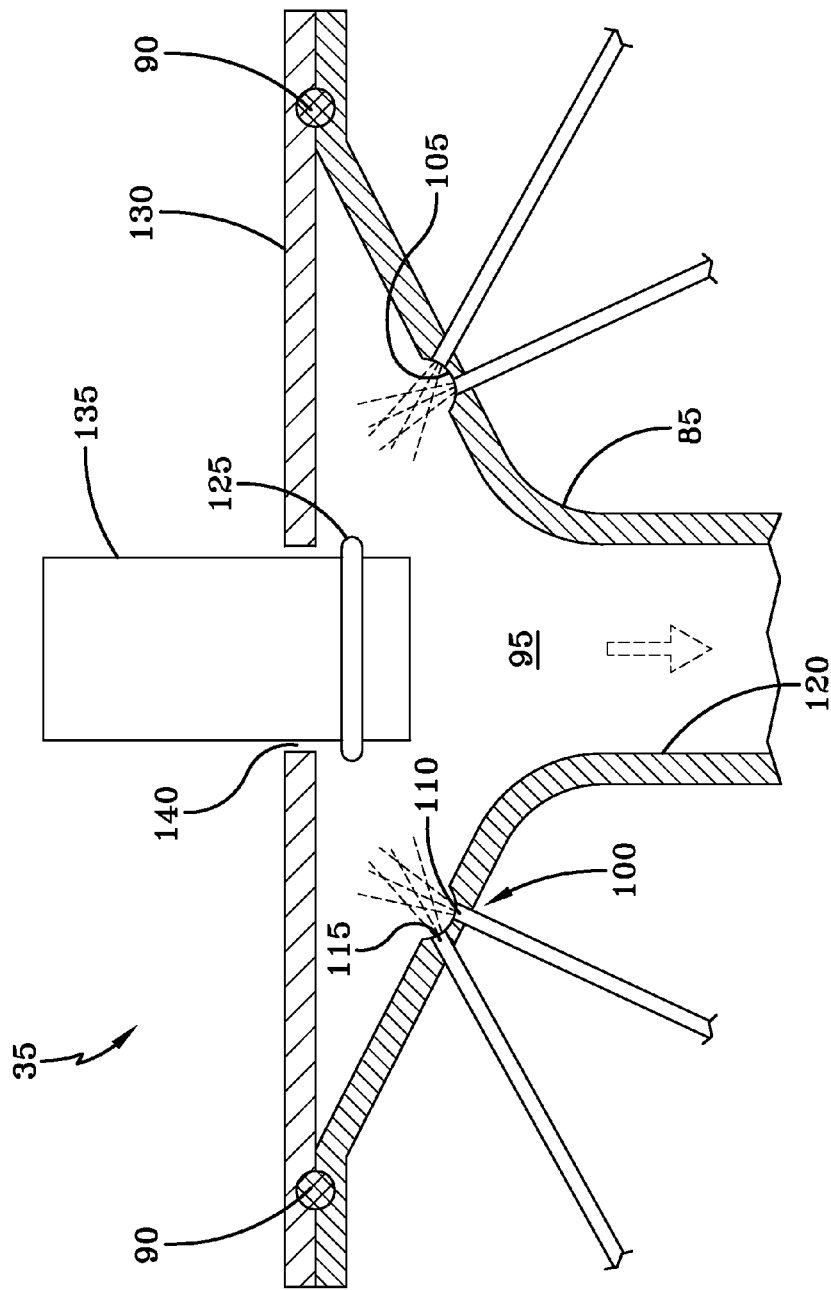
FIG. 4 schematically illustrates application of lubricant to a component by the spray head of FIG. 3.

When the pump 20 is activated by the actuator 30, lubricant is caused to fill a lubricant groove 105 in the spray head 35, whereafter a burst of pressurized air is emitted from several air nozzles 115 to atomize the lubricant and to project it onto the component to be lubricated (see FIGS. 3-4). The pneumatic pump 20 comprises multiple (in this case, four) individual pumps to produce the proper lubricant/air supply timing. A drainage line 50 is provided to transfer excess lubricant from the spray head 35 back to the reservoir 25 for subsequent re-use. More than one drainage line may be employed in alternative embodiments.

Figure 2:
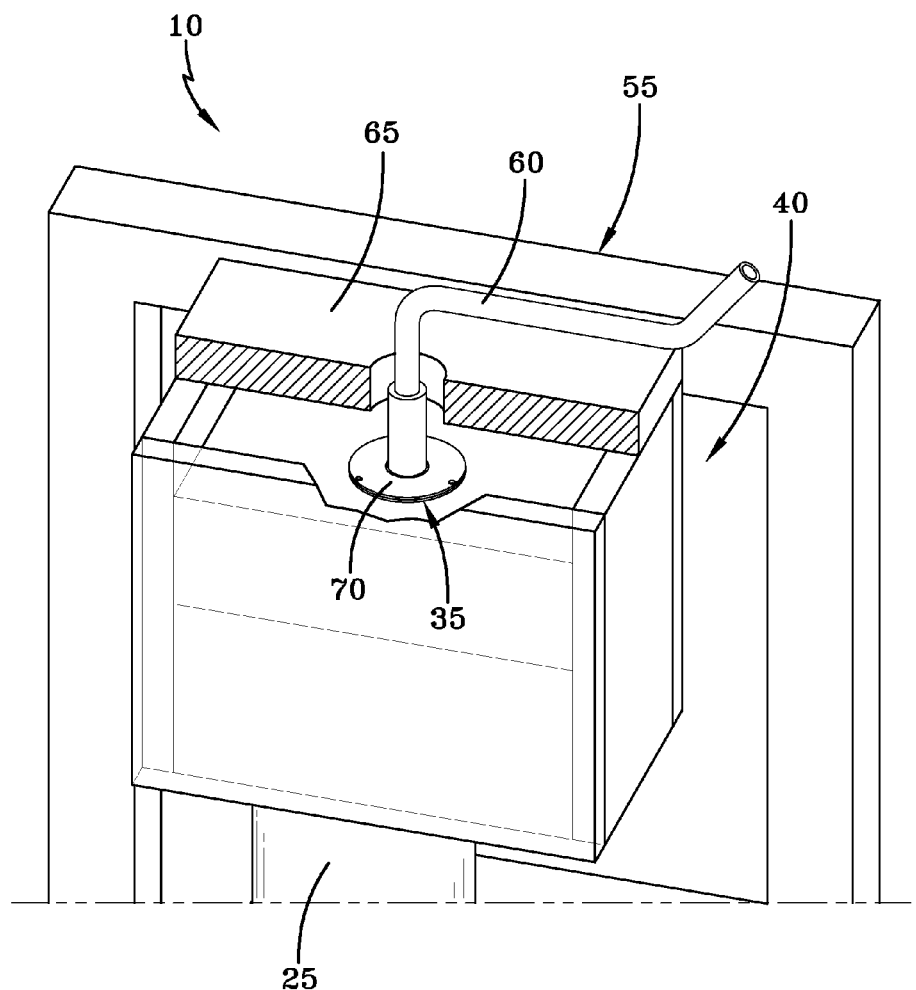
FIG. 2 is a partial top perspective view of the exemplary device of FIG. 1, showing a component to be lubricated associated with a lubrication chamber and spray head thereof.

FIG. 2 shows a partial view of the system 10, wherein a part 60 having a component to be lubricated has been temporarily located to the lubrication chamber 40 and its associated spray head 35. The portion of the part 60 having the component to be lubricated is passed through a wall 65 of the lubrication chamber 40 and a cover plate 70 of the spray head 35. In this particular example, the part 60 having the component to be lubricated is a portion of an automobile HVAC system. However, it is to be understood that the present invention is not limited to use with a particular component or type of component.

Details of the spray head 35 are depicted in FIGS. 3-4. For purposes of clarity, the cover plate 70 of FIGS. 1-2 has been removed in FIG. 3. Further, alternative cover plates 75, 80 are shown in FIG. 3 to illustrate that a number of different cover plates may be provided to accommodate a number of different components to be lubricated. In this example, the diameter of opening 75a in the leftmost cover plate 75 is shown to be smaller than the diameter of the opening 80a of the rightmost cover plate 80 so as to receive different components to be lubricated. It should be obvious to one of skill in the art that the size and/or shape of the opening in any cover plate may be adjusted as required to accommodate various components to be lubricated, and nothing herein is to be interpreted as limiting the present invention to use with a component of a particular shape or size.

With the cover plate 70 removed, a base 85 of the spray head 35 can be observed. A gasket 90 (such as the o-ring shown) may be used to provide a seal between a given cover plate and the base 85. With a cover plate installed, a substantially enclosed cavity 95 is formed between the base 85 and the cover plate (see FIG. 4). The cavity 95 is substantially closed to the environment so that sprayed lubricant cannot readily escape. However, as can be best observed in FIG. 4, the cavity 95 of this embodiment is not completely sealed due to clearances built in to the component receiving holes in the spray head cover plates (as described in more detail below).

Referring again to FIG. 3, the base 85 contains a number of apertures (in this case, three) 100 that exit into a lubricant groove 105. A lubricant orifice 110 is provided in each aperture 100. Each lubricant orifice 110 is associated with a lubricant supply line to supply lubricant to the lubricant groove 105. An air nozzle 115 also exits into each of the apertures 100, as can be better observed in FIG. 4. The air nozzles 115 are in fluid communication with associated air supply lines coming from the pneumatic pump 20, such that a burst of pressurized air supplied to the air nozzles will atomize and eject lubricant from the lubricant groove 105 onto a component located within the enclosed cavity 95. A draining aperture 120 is in fluid communication with the drainage line 50, which allows unused lubricant to return to the reservoir 25.

FIG. 4 illustrates operation of the spray head 35 to lubricate an exemplary component 125 that has been inserted through a corresponding cover plate 130 of the spray head. In this particular embodiment, the component to be lubricated 125 is an o-ring, which is located on one end of a HVAC assembly part (tube) 135. The gasket 90 can be seen to provide a seal between the cover plate 130 and the base 85 of the spray head 35, thereby defining the cavity 95.

As mentioned above, the cavity 95 is not completely sealed in this particular embodiment. Rather, a small gap 140 may exist between the cover plate 130 and the portion of the part 135 having the component to be lubricated 125 when the component to be lubricated is located to the spray head 35. This gap 140 results from the clearance provided in the hole of the cover plate 130 to permit unhindered insertion of a component to be lubricated. Even with such a gap present, it has been found that overspray is nonetheless contained within the spray head because the cavity 95 is not highly pressurized during a lubricating operation.

While not shown herein, it is also possible to install an o-ring or other sealing element within a hole in a spray head cover plate to further seal the associated spray head cavity. Such a sealing element may have a variety of shapes and may be constructed from a number of appropriate materials as would be understood by one of skill in the art. An exposed surface of the sealing element would ideally contact a corresponding surface of a part protruding through the hole in an associated cover plate so as to provide a seal between the cover plate and the part.

With the component to be lubricated 125 properly inserted into the spray head 35, an operator engages the actuator 30, which causes the pump 20 to force a predetermined amount of lubricant from the reservoir 25, through associated lubricant supply lines, to the lubricant orifices 110. Preferably, the pump 20 is associated with a pulse generator 155 that limits lubricant pump 145 operation in some predetermined manner each time the actuator 30 is activated. For example, the pulse generator 155 may cause the lubricant pump 145 to dispense one metered drop of lubricant each time the actuator 30 is activated and released. Alternatively, the pulse generator 155 may cause the lubricant pump 145 to dispense an amount of lubricant every five seconds if the actuator 30 is maintained in an activated position. Obviously, these are only examples, and other regulation of the lubricant pump 145 by the pulse generator 155 is possible.

Lubricant is caused to flow through the lubricant orifices 110 and out of the apertures 100 into the lubricant groove 105. A backflow of lubricant from the lubricant groove 105 is prevented by a check valve or similar device in each of the lubricant supply lines. Thus, once lubricant is supplied to the lubricant groove 105, the lubricant will remain therein until ejected as described below or until displaced by further operation of the pump 20.

When the operator engages the actuator 30, an operating sequence is initiated that first causes lubricant to be transferred to the lubricant groove 105 of the spray head 35, as described above. Subsequent thereto, the air pump portion 150 of the pump 20 activates to transfer pressurized air to the air nozzles 115 via the air supply lines. This pressurized air is emitted from the air nozzles 115 as a brief burst that atomizes and ejects lubricant from the lubricant groove 105 and onto the component to be lubricated.

As shown in FIG. 4, this particular embodiment of the present invention includes air nozzles 115 that are oriented at an angle to better direct lubricant from the lubricant groove 105 onto the component to be lubricated 125. Other embodiments may employ different air nozzle orientations and/or a lesser or greater number of air nozzles. Additionally, the air nozzles employed in a given embodiment may provide different spray patterns to best lubricate the particular component to be lubricated.

Excess lubricant sprayed into the cavity 90 is collected at the draining aperture 120 and is returned to the reservoir 25 via the drain line 50 for subsequent re-use. Thus, it can be understood that a system and method of the present invention essentially provides a closed-loop system where overspray and excess lubricant can be readily captured and re-used. In addition to providing a cost savings associated with reduced lubricant waste, a system and method of the present invention also prevents the transfer of lubricant to the surrounding environment, including to other workspaces and/or personnel. As such, the area surrounding the location of such a system remains free of lubricant, thereby ensuring a clean and safe working area.

While certain exemplary embodiments of the present invention are described in detail above, the scope of the invention is not to be considered limited by such disclosure, and modifications are possible without departing from the spirit of the invention as evidenced by the following claims:

What is claimed is:

1. A spray head for lubricating components, comprising:
  a base;
  a cover plate attached to the base and having an opening adapted to receive therethrough a component to be lubricated, an area between the base and cover plate defining a substantially enclosed cavity;
  a groove in the base for receiving a lubricant;
  an aperture in fluid communication with the groove and a source of lubricant to fill at least a portion of the groove with the lubricant;
  a nozzle in fluid communication with the groove;
  a pressurized air source in fluid communication with the nozzle and selectively operable to supply a burst of pressurized air to the groove to atomize and project lubricant from the groove and onto a component to be lubricated; and a draining aperture in the cavity for returning excess lubricant to the source of lubricant.

2. The spray head of claim 1, further comprising a gasket between the cover plate and the base.

3. The spray head of claim 1, further comprising a lubrication chamber surrounding the spray head.

4. The spray head of claim 1, further comprising interchangeable cover plates, each having a different opening.

5. A system for lubricating components, comprising:
a reservoir containing lubricant;
a lubrication chamber including an enclosed spray head, the spray head further comprising:
    a base,
    a cover plate attached to the base and having an opening adapted to receive therethrough a component to be lubricated, an area between the base and cover plate defining a substantially enclosed cavity when the component to be lubricated is present,
    a groove in the base for receiving a lubricant,
    an aperture for emitting a lubricant mist onto a component to be lubricated while the component resides in the cavity, the aperture in fluid communication with the lubricant groove and a source of lubricant and adapted to fill at least a portion of the groove with the lubricant,
    an air nozzle in fluid communication with the aperture, and
    a draining aperture in the cavity for returning excess lubricant to the lubricant reservoir,
a supply line for transporting lubricant from the reservoir to the aperture of the spray head;
a supply line for transporting pressurized air to the air nozzle of the spray head;
a drainage line for returning excess lubricant from the spray head to the reservoir;
a pump that respectively forces lubricant and air through corresponding supply lines to the aperture and air nozzle of the spray head, the pump in fluid communication with the lubricant reservoir and a supply of pressurized air and selectively operable to supply a burst of pressurized air to the air nozzle to atomize and project lubricant from the groove and onto a component to be lubricated; and
an actuator in electrical communication with the pump.

6. The system of claim 5, further comprising a gasket between the cover plate and the base of the spray head.

7. The system of claim 5, wherein the pump is a pneumatic pump in fluid communication with a source of pressurized air, the pump including a lubricant pump portion and an air pump portion.

8. The system of claim 7, wherein the pump operates in sequence to supply lubricant to the spray head prior to supplying pressurized air to the spray head.

9. The system of claim 7, further comprising a pulse generator associated with the lubricant pump portion of the pump, the pulse generator limiting the amount of lubricant supplied to the spray head when the lubricant pump portion of the pump is activated.

10. The system of claim 5, further comprising a check valve in the lubricant supply line for preventing a backflow of lubricant.

11. The system of claim 5, wherein the aperture includes a lubricant orifice for emitting lubricant.

12. The system of claim 5, wherein the spray head includes multiple apertures, each having an air nozzle.

13. The system of claim 5, further comprising:
multiple apertures;
a lubricant groove in communication with the apertures and provided to receive and contain an amount of lubricant supplied through the aperture;
a lubricant orifice in each aperture through which lubricant is supplied to the lubricant groove; and
an air nozzle exiting into each aperture, the air nozzles in fluid communication with the air pump portion of the pump for supplying a burst of pressurized air to atomize and eject lubricant from the lubricant groove and onto a component to be lubricated.

14. The system of claim 13, wherein the air nozzles are directed toward a center of the cavity.

15. The system of claim 5, wherein at least the lubricant reservoir, lubrication chamber and pump are attached to a framework.

16. A system for lubricating components, comprising:
a reservoir containing lubricant;
a pump assembly in fluid communication with the lubricant reservoir and a source of pressurized air, the pump assembly including a lubricant pump portion and an air pump portion;
a lubrication chamber including an enclosed spray head, the spray head further comprising:
    a base,
    a cover plate attached to the base and having an opening adapted to receive therethrough a component to be lubricated, an area between the base and cover plate defining a substantially enclosed cavity when the component to be lubricated is present,
    a lubricant groove residing within the cavity, the lubricant groove for receiving and containing an amount of lubricant,
    a plurality of apertures opening into the lubricant groove,
    a lubricant orifice in each aperture for supplying lubricant to the lubricant groove, the lubricant orifices in fluid communication with the lubricant pump portion of the pump assembly,
    an air nozzle exiting into each aperture, the air nozzles in fluid communication with the air pump portion of the pump assembly, and
    a draining aperture in the cavity for returning excess lubricant to the lubricant reservoir,
supply lines for transporting lubricant from the lubricant pump portion of the pump assembly to the lubricant orifices of the spray head;
supply lines for transporting pressurized air from the air pump portion of the pump assembly to the air nozzles of the spray head;
a drainage line for returning excess lubricant from the drainage aperture of the spray head to the lubricant reservoir; and
an actuator in electrical communication with the pump;
wherein, upon activation of the actuator, the lubricant pump portion of the pump assembly causes lubricant to be transferred from the lubricant reservoir to the lubricant groove in the spray head; and
wherein, subsequent thereto, the air pump portion of the pump assembly sends a burst of pressurized air to the air nozzles, thereby atomizing and ejecting at least a portion of the lubricant in the lubricant groove onto a component to be lubricated.

17. The system of claim 16, further comprising a pulse generator associated with the lubricant pump portion of the pump assembly, the pulse generator limiting the amount of lubricant supplied to the spray head when the lubricant pump portion of the pump assembly is activated.

18. The system of claim 16, further comprising a check valve in the lubricant supply lines for preventing a backflow of lubricant.

19. A method for lubricating components, comprising:
(a) providing a lubrication system, the lubrication system further comprising:
   a reservoir containing lubricant;
   a lubrication chamber including an enclosed spray head, the spray head further comprising:
      a base,
      a cover plate attached to the base and having an opening adapted to receive therethrough a component to be lubricated, an area between the base and cover plate defining a substantially enclosed cavity when the component to be lubricated is present,
      at least one aperture for emitting a lubricant mist onto a component to be lubricated while the component resides in the cavity, the at least one aperture in fluid communication with a source of lubricant and a lubricant groove, and
      a draining aperture in the cavity for returning excess lubricant to the lubricant reservoir,
   a supply line for transporting lubricant from the reservoir to the at least one aperture of the spray head;
   a supply line for transporting pressurized air to the at least one aperture of the spray head;
   a drainage line for returning excess lubricant from the spray head to the reservoir;
   a pump that forces lubricant and air through corresponding supply lines to the at least one aperture of spray head, the pump in fluid communication with the lubricant reservoir and a supply of pressurized air; and
   an actuator in electrical communication with the pump,
(b) passing a component to be lubricated through the opening in the cover plate of the spray head and into the cavity;
(c) engaging the actuator, which activates the pump to first transfer lubricant to the spray head so as to at least partially fill the lubricant groove therewith, and to subsequently transfer pressurized air to the spray head;
(d) using said pressurized air to atomize and eject lubricant from the lubricant groove into the cavity and onto the component to be lubricated;
(e) collecting excess lubricant in the base of the spray head; and
(f) returning the excess lubricant to the reservoir via the drainage aperture and drainage line for subsequent reuse.

* * * * *